US008638821B2

(12) United States Patent
Temple et al.

(10) Patent No.: US 8,638,821 B2
(45) Date of Patent: Jan. 28, 2014

(54) METHOD FOR ADJUSTING TIME SLOTS IN A COMMUNICATION NETWORK

(75) Inventors: Christopher Temple, Munich (DE); Mathias Rausch, Markt Schwaben (DE)

(73) Assignee: Freescale Semiconductor, Inc., Austin, TX (US)

( * ) Notice: Subject to any disclaimer, the term of this patent is extended or adjusted under 35 U.S.C. 154(b) by 251 days.

(21) Appl. No.: 13/063,214

(22) PCT Filed: Sep. 18, 2008

(86) PCT No.: PCT/IB2008/053798
§ 371 (c)(1),
(2), (4) Date: Mar. 10, 2011

(87) PCT Pub. No.: WO2010/032083
PCT Pub. Date: Mar. 25, 2010

(65) Prior Publication Data
US 2011/0164626 A1   Jul. 7, 2011

(51) Int. Cl.
 *H04J 3/00*  (2006.01)
(52) U.S. Cl.
 USPC .......................................... 370/498; 370/321
(58) Field of Classification Search
 USPC .................................................. 370/498, 321
 See application file for complete search history.

(56) References Cited

U.S. PATENT DOCUMENTS

| 2004/0180684 | A1 | 9/2004 | Chen et al. |
| 2005/0141565 | A1* | 6/2005 | Forest et al. ................. 370/503 |
| 2005/0219114 | A1 | 10/2005 | Kawabe et al. |
| 2006/0045133 | A1* | 3/2006 | Temple et al. ............... 370/498 |

FOREIGN PATENT DOCUMENTS

| EP | 1280024 B1 | 4/2009 |
| WO | 2004/051925 A2 | 6/2004 |
| WO | 2007/055972 A | 5/2007 |

OTHER PUBLICATIONS

International Search Report and Written Opinion correlating to PCT/IB2008/053798 dated Apr. 8, 2009.

* cited by examiner

*Primary Examiner* — Anh-Vu Ly
*Assistant Examiner* — Hashim Bhatti

(57) ABSTRACT

A communication network includes a plurality of communication nodes, each node arranged for communicating frames of data with the other nodes during a dynamic segment having dynamic communication slots with respective communication slot numbers. Each of the plurality of communication nodes includes a time base having consecutive timeslots, associated with the dynamic communication slots; a communication slot number controller, for adjusting a communication slot number, a minislot counter for counting minislots while the adjusting of the communication slot counter is suspended and a control unit for controlling the communication slot number controller to either continue adjusting of the slot number if the determined duration of the reception is above a certain threshold or to continue adjusting of the slot number using the value obtained with the minislot counter if the determined duration of the reception is below a certain threshold.

20 Claims, 7 Drawing Sheets

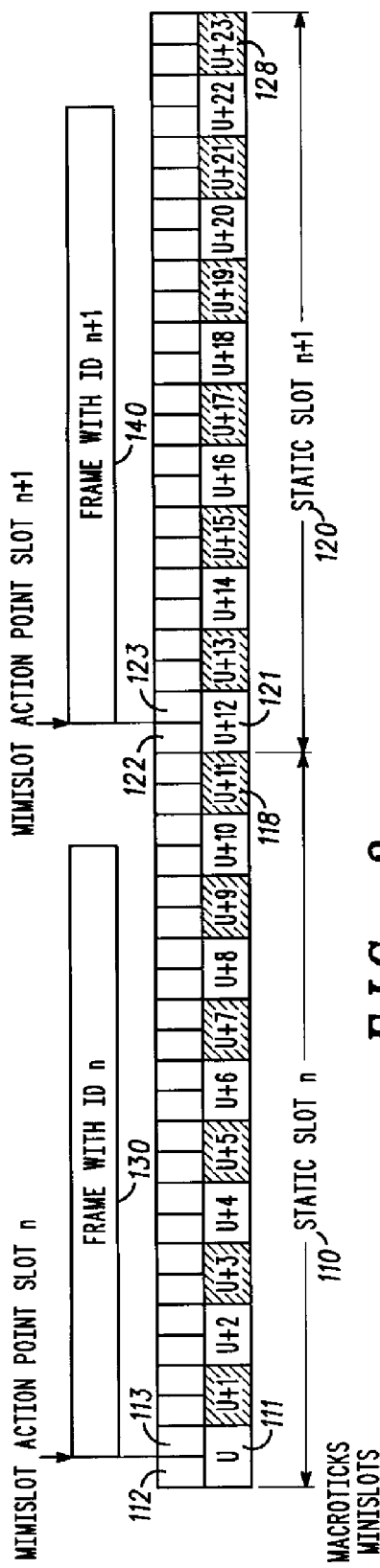
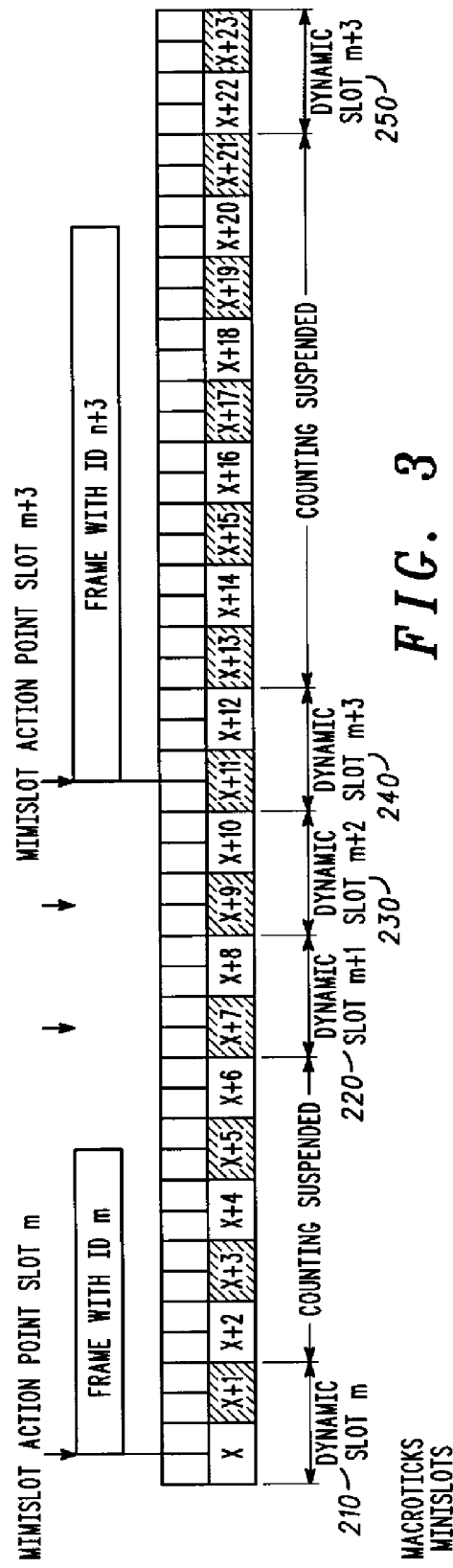
FIG. 2
FIG. 3

US 8,638,821 B2

METHOD FOR ADJUSTING TIME SLOTS IN A COMMUNICATION NETWORK

FIELD OF THE INVENTION

This invention relates to a system, network node, a method and a communication controller.

BACKGROUND OF THE INVENTION

In the field of communication protocols for multi-node communication systems various methods are known how to provide collision free arbitration.

For example, the FlexRay protocol is specified to use a TDMA (Time Division Multiple Access) scheme for the static segment and a FTDMA (Flexible Time Division Multiple Access) type scheme using a dynamic minislotting based arrangement for the dynamic segment.

However, the dynamic minislotting based arrangement is susceptible to situations where some (asymmetric case) or all (symmetric case) nodes receive invalid communication elements. Such invalid communication elements can be either noise or invalid frames, i.e. frames that have, for example, been invalidated by noise. In general noise will be of shorter duration than invalid frames. Since noise is induced externally there is no node actively transmitting noise.

The dynamic minislotting-based arrangement relies on every node using a slot counter and slot identification numbers that are uniquely allocated to the nodes. To avoid collisions the slot counter needs to remain consistent among the nodes throughout the dynamic segment. Various noise conditions can break the consistency of the slot counter ultimately leading to collisions on the network.

SUMMARY OF THE INVENTION

The present invention provides a system, network node, a method and a communication controller as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

FIG. 2 shows a timing diagram illustrating a structure and arbitration of a static segment of the timing hierarchy of FIG. 1.

FIG. 3 shows a timing diagram illustrating a structure of a dynamic segment of the timing hierarchy of FIG. 1 along with the arbitration principle.

DETAILED DESCRIPTION OF THE PREFERRED EMBODIMENTS

A multi-node wired communications system (not shown) such as a brake-by-wire system in an automobile, comprises a number of nodes, each of which is arranged to send and receive data to and from the other nodes of the system.

As described in International Patent Application Publication WO2004051925, incorporated herein by reference, a node may have access to two time bases of different granularity. A time base of high granularity may be defined in terms of microticks. The microtick defines a time base that is unsynchronised in both phase and frequency among different nodes. The second time base, which is of low granularity, is defined in terms of macroticks. The macrotick defines a timebase that is synchronized in both phase and frequency within a precision p among all synchronized nodes. A synchronization approach, for example suitable for FlexRay, that satisfies this assumption is disclosed in European Patent EP 1280024, incorporated herein by reference.

Media arbitration distinguishes between two distinct phases: the initial unsynchronized startup phase and the subsequent synchronized operation phase. The two phases differ as follows:

during the initial startup phase the node has no knowledge of the system wide synchronized time, i.e. the macrotick time base is not established.

during the synchronized operation phase the node has knowledge of the system wide synchronized time, i.e. the macrotick time base is established.

During the unsynchronised startup phase media arbitration is not required for one of two reasons. Firstly, the node may be integrating into an already operational cluster, in which case a first transmission does not occur until the node is in synchronized operation phase. Secondly, the cluster may not be operational, in which case no other sender is present, i.e. no arbitration of the media is required.

Figure 1:
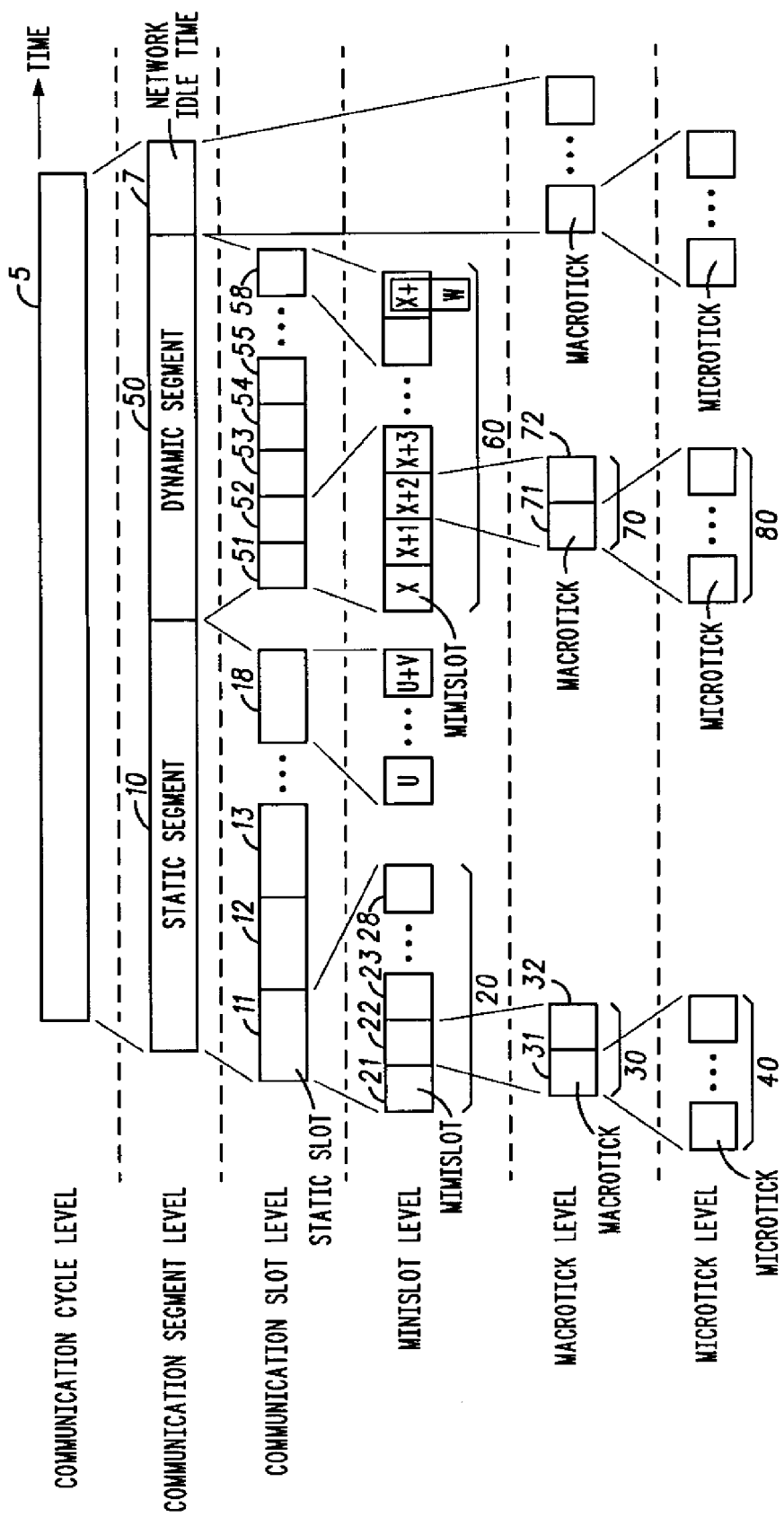
FIG. 1 shows a composite timing diagram illustrating a timing hierarchy of the present invention.

Referring now to FIG. 1, there is shown a composite timing diagram of a timing hierarchy according to the present embodiment. Transmission within the synchronized operation phase occurs within a temporally recurring communication cycle 5.

Figure 9:
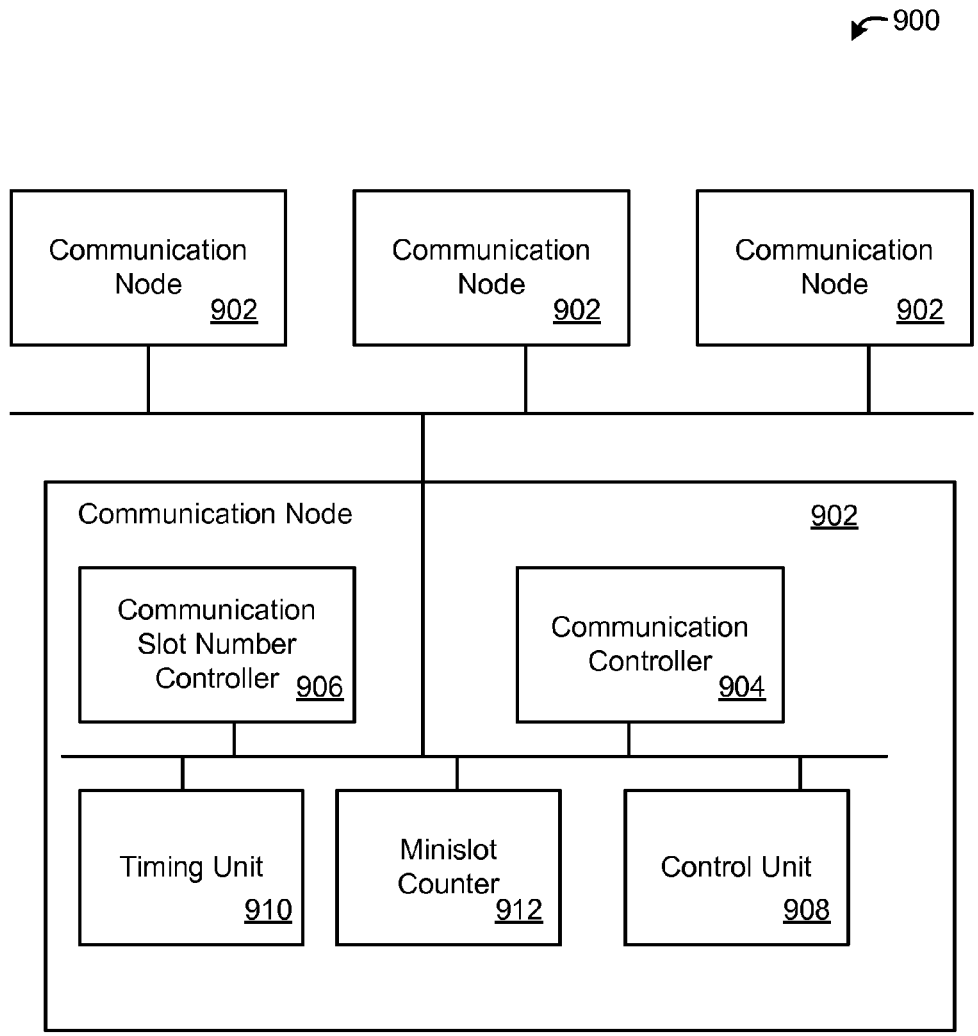

The communication cycle 5 is in effect a timebase which is shared across all communication nodes 902 of the communication network/system 900 of FIG. 9. The timebase has substantially the same error tolerance in each node 902.

The communication cycle 5 consists of a communication period (CP) made up of two segments: a static segment 10 and a dynamic segment 50 (during which transmissions may take place), and an optional traffic-free period, the network idle time (NIT) 7.

The static segment 10 is subdivided into a number of static slots illustrated in FIG. 1 by static slots 11 12,13, 18.

Each of the static slots 11,12, 13,18 is made up of a set of consecutive time intervals, called minislots. For example, the static slot 11 is made up of a set 20 of minislots, including minislots 21,22, 23 and 28. Each static slot has the same number (v) of minislots. The minislots define a temporal grid that serves as a basis for the media arbitration, to be further described below.

Each minislot consists of a set of at least two macroticks. By way of example, minislot 22 comprises a set 30 of macroticks, including macroticks 31 and 32.

Each macrotick comprises a set of microticks. For example, the macrotick 32 comprises the set 40 of microticks.

The dynamic segment 50 is subdivided into a number of dynamic slots illustrated in FIG. 1 by dynamic slots 51, 52, 53, 58.

Each of the dynamic slots 51,52, 53,58 is made up of a number of minislots of a set 60 of minislots.

However, unlike the static slots, each of the dynamic slots may be a different length, so may be made up of a different number of minislots. The dynamic slot 51 is made up of minislots 61 and 62 in this example, but the number of minislots used by each dynamic slot is dynamically allocated in a manner to be further described below.

As described above with respect to the static segment 10, each minislot of the dynamic segment 50 consists of a set of at least two macroticks. By way of example, minislot 63 comprises a set 70 of macroticks, including macroticks 71 and 72.

Each macrotick comprises a set of microticks. For example, the macrotick 71 comprises the set 80 of microticks.

It will be appreciated that the set of microticks 80 are part of the same timing framework as the set of microticks 40 as are all microticks of the system, and similarly the set of macroticks 30 are part of the same timing framework as the set of macroticks 70 as are all macroticks of the system.

All minislots consist of an equal number of macroticks. A dedicated instant within each minislot is called the minislot action point.

The minislot action point coincides with the boundary of two subsequent macroticks within the minislot.

Arbitration in both segments is performed by means of frame priorities and a slot counting scheme. Unique frame priorities, referred to as frame identifiers starting with 1 are distributed among the nodes. The frame identifier determines when a frame will be sent within the communication phase. Each node maintains a slot counter that is initialised with 1 at the start of each communication cycle.

Referring now to FIG. 2 there is shown the timing structure and the arbitration principle of a static segment such as the static segment 10 of FIG. 1.

A unique slot ID ranging from 1 to g (total number of static slots) is assigned to every static slot of the static segment. A first slot 110 has the number n, and a second, consecutive slot 120 has the number n+1. All static communication slots are of equal duration, this being the chosen integral number of minislots, multiplied by the minislot duration. In the example of FIG. 2, the first slot has 12 minislots, from slot 111 (*u*) to slot 118 (*u*+11) and the second slot has 12 minislots, from slot 121 (*u*+12) to slot 128 (*u*+23). The duration of a static slot is chosen such that the static slot always accommodates the transmission of the frame associated with it through the slot ID/frame ID relationship.

Frame transmission occurs if the slot counter equals the frame identifier of a frame to send. In the example of FIG. 2 the first frame 130 having frame ID n, will be transmitted during the first static slot 110, and the second frame 140 having frame ID n+1, will be transmitted during the second static slot 120.

Frame transmission starts at the minislot action point within the first minislot of the respective static slot.

Therefore the frame transmission of the first frame 130 starts at the minislot action point of minislot 111 (that being the transition between microticks 112 and 113 respectively). Similarly the frame transmission of the second frame 140 starts at the minislot action point of minislot 121 (that being the transition between microticks 122 and 123 respectively).

At the end of every static slot the slot counter is incremented by one. As the advancement of the slot counter occurs independently from whether and from when access to the media takes place, arbitration in the static segment is robust against communication faults in the sense that any disturbance within a slot will not impact arbitration within unaffected slots.

Referring now also to FIG. 3, there is shown a timing diagram illustrating the structure of a dynamic segment and associated arbitration principle.

The dynamic segment is subdivided into a number of dynamic communication slots. A first dynamic slot 210 has number m, a second, consecutive slot 220 has number m+1.

Similarly third, fourth and fifth slots 230,240 and 250 have numbers m+2, m+3 and m+4 respectively.

Each dynamic slot consists of at least one minislot. The exact number depends on the type of faults for which collision free recovery should be assured: one minislot for fault-free assumption and two minislots for single transmission related faults.

As with the static scenario described above, frame transmission occurs if the slot counter equals the frame identifier of a frame to send. Once again frame transmission starts at the minislot action point within the first minislot of the respective dynamic slot.

However unlike the static case, frame transmission must also end at a minislot action point. If the frame would not otherwise end at a minislot action point by virtue of its data length, then the transmitter must extend the transmission by producing a busy signal. This prevents premature idle detection by the receivers.

At the end of every dynamic slot in which no message transmission or reception occurs, the slot counter is incremented by one, via the communication controller 904 or the communication slot number controller 906 as controlled by the control unit 908 of FIG. 9, i.e. while a message is being transmitted or received the process of incrementing the slot counter is suspended.

By virtue of the procedure all fault-free receivers agree implicitly on the dynamic slot, in which the transmission takes place, i.e. the slot counter of all fault-free receivers matches the slot counter of the fault-free sender and the frame ID value transmitted in the frame.

In order to handle faults the dynamic slots must each consist of (at least) two minislots. The first minislot may be termed a matching minislot and the second minislot may be termed a mismatching minislot. Furthermore the minislot action point of the first minislot is called the minislot match action point, the minislot action point of the second minislot is called the minislot mismatch action point. According to the above rules frame transmission starts at the minislot match action point and ends at a minislot action point (either match or mismatch).

Two types of faults are of interest: a) the start of a reception (frame or noise) does not align to a minislot action point, and, b) the end of a reception does not align to a minislot action point.

For the fault a) above, if frame reception starts in the matching minislot (that is a minislot having a matching action point) then the receiver is aligned with the transmitter and no slot correction is required. However if frame reception starts in a mismatching minislot (a minislot having a mismatching action point) then the receiver has to adjust its minislot phase relationship to match the transmitter. In order to do this it is necessary to evaluate the frame ID contained in the frame being received, in order to know whether to retard by one minislot to the previous matching minislot or to advance by one minislot to the next matching minislot.

Figure 4:
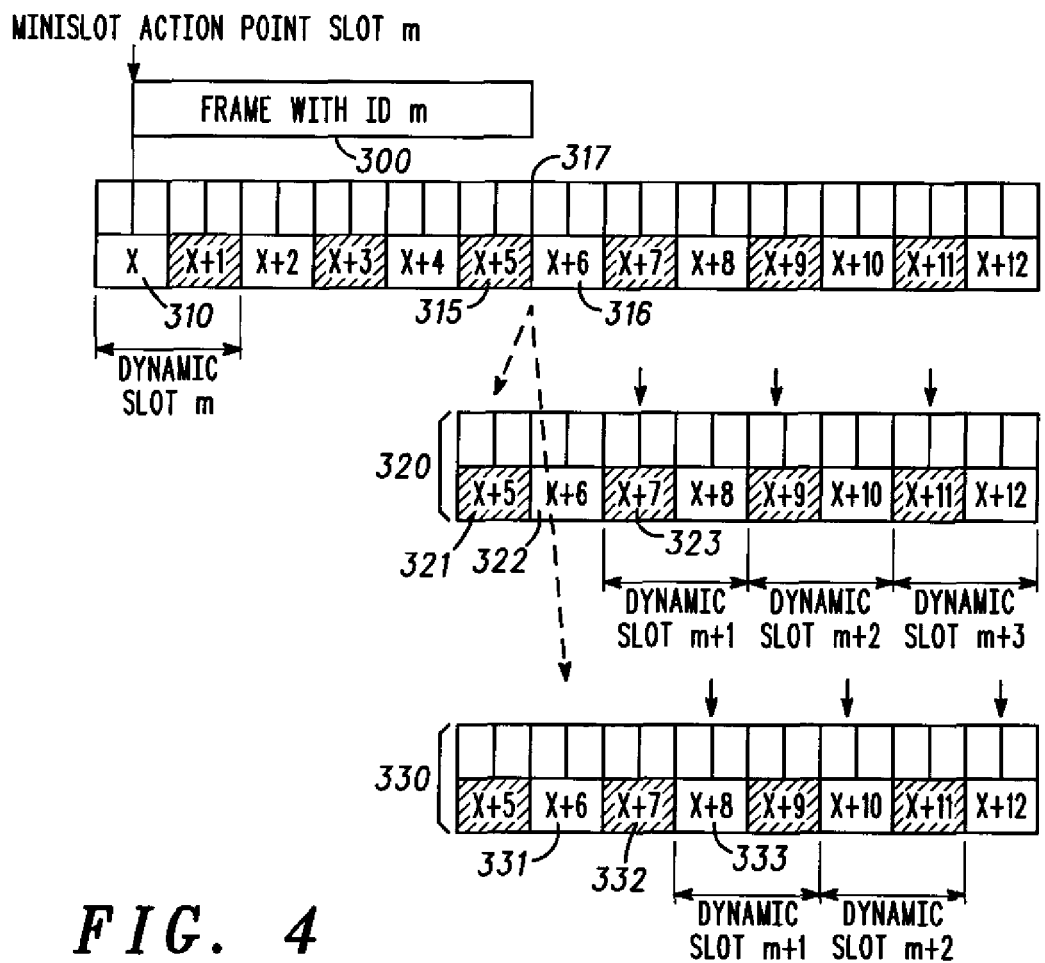
FIG. 4 shows a composite timing diagram illustrating the procedure for handling symmetric faults.
Figure 5:
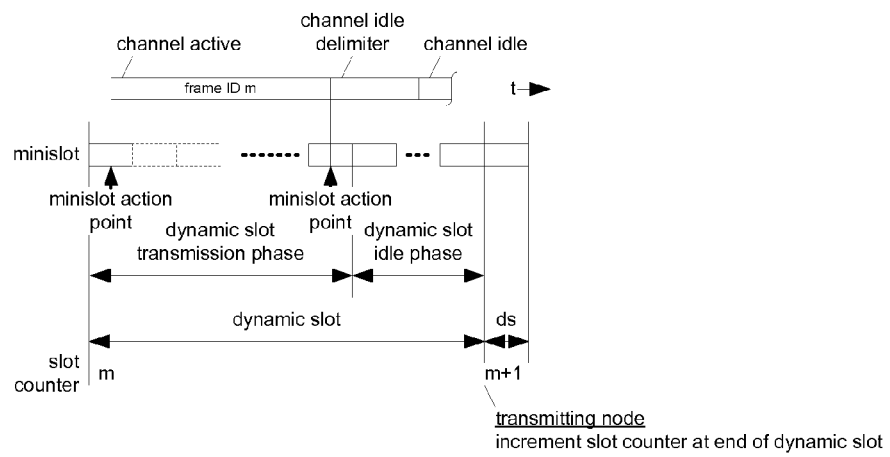
FIG. 5 schematically shows an example of an embodiment of a timing schedule.
Figure 6:
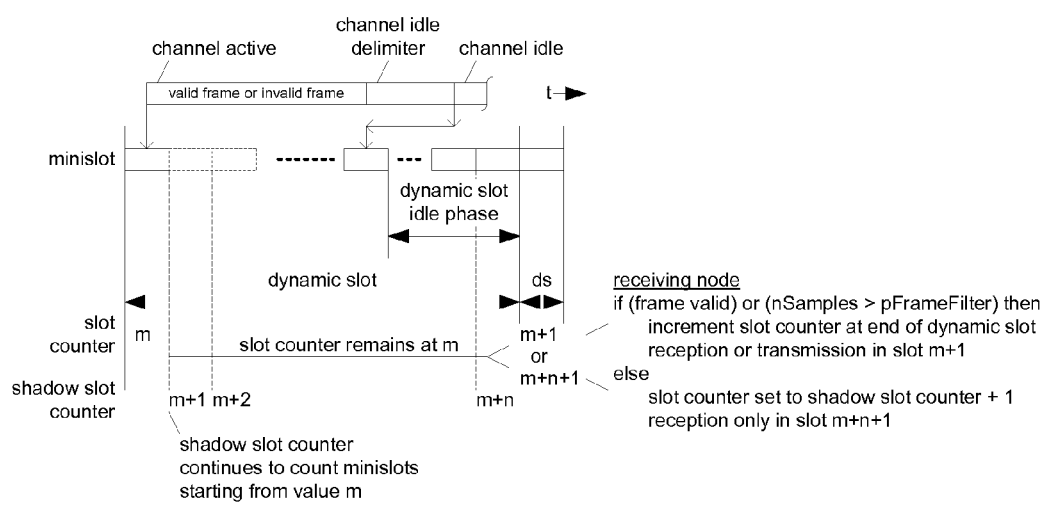
FIG. 6 schematically shows an example of an embodiment of a timing schedule.
Figure 7:
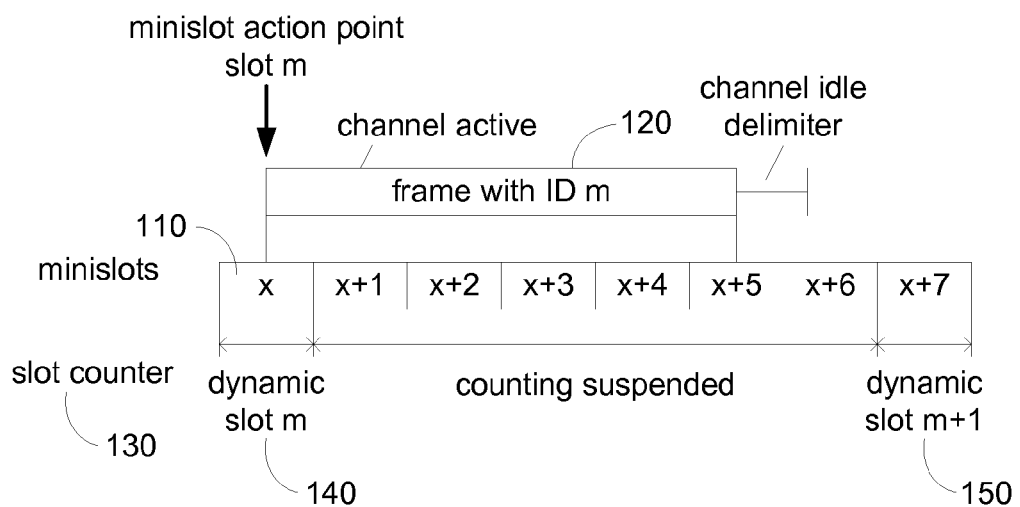
FIG. 7 schematically shows an example of an embodiment of a timing schedule.
Figure 8:
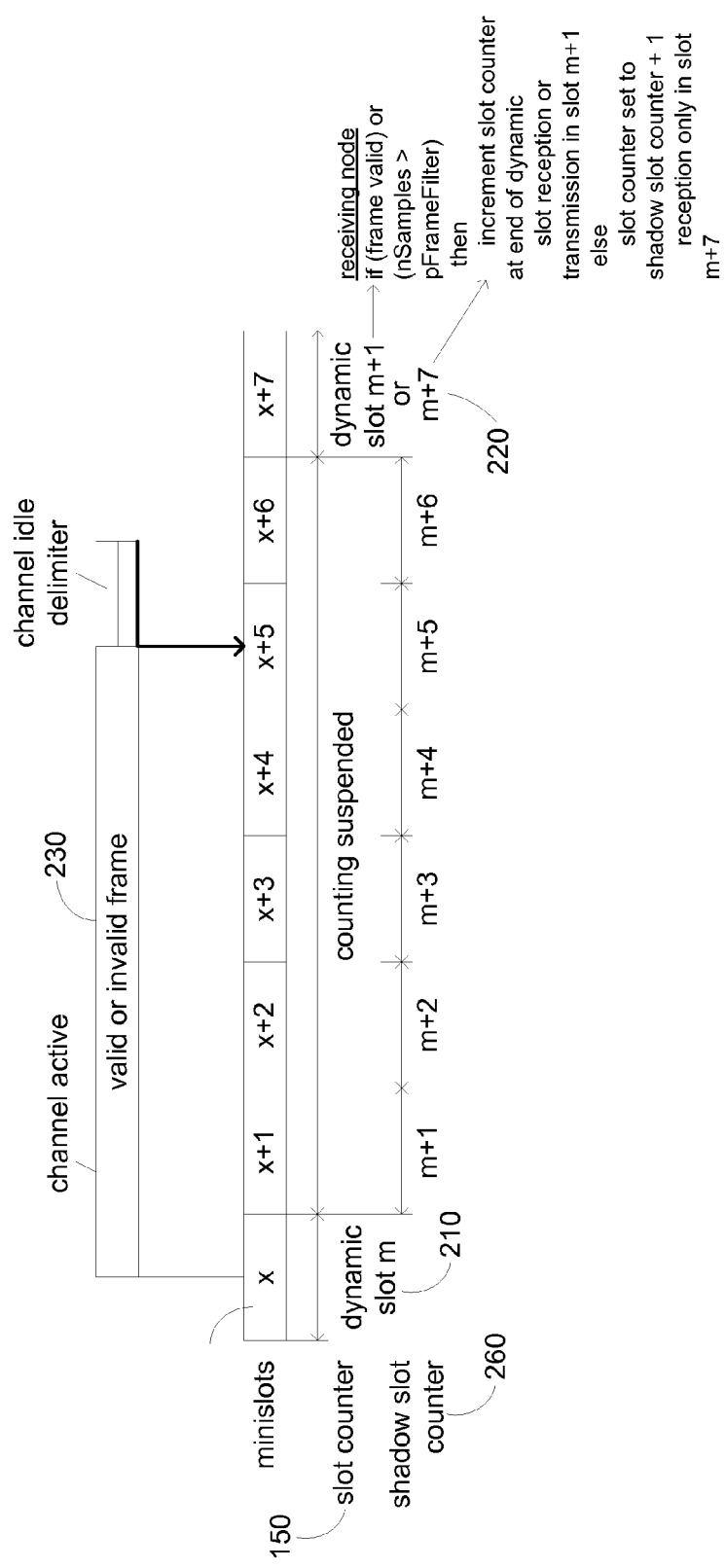
FIG. 8 schematically shows an example of an embodiment of a timing schedule.

Referring now also to FIG. 4 there is shown a composite timing diagram illustrating the handling of fault b) above, namely that the end of frame reception does not align to a minislot action point. A frame 300 with frame ID m starts at the minislot action point of the first minislot x of dynamic slot m (labelled 310). The end of frame 300 coincides with a minislot boundary 317 which occurs at the end of minislot x+5 (labelled 315) and start of minislot x+6 (labelled 316).

Since the end of reception of a frame, duration of which is determined by the timing unit 910 of FIG. 9, may occur in either a matching or mismatching minislot, where a frame ends at a minislot boundary as in the boundary 317 of FIG. 4, it is unclear which one of minislots 315 and 316 is to be treated to be the minislot in which the frame has ended.

As will be appreciated for a dynamic segment, this leads to ambiguity over where the next dynamic slot (slot m+1) will start.

One group of nodes may assume that the frame 300 has ended in minislot 315 (x+5), whereupon this group of nodes adopts the timeline 320. According to the timeline 320, since the frame 300 has ended in minislot x+5 (labelled 321 in timeline 320), there will follow empty minislot x+6 (labelled 322) before the next dynamic slot (slot m+1) commences at matching minislot x+7 (labelled 323).

Another group of nodes may assume that the frame 300 has ended in minislot 316 (x+6), whereupon this group of nodes adopts the timeline 330. According to the timeline 330, since the frame 300 has ended in minislot x+6 (labelled 331 in timeline 320), there will follow empty minislot x+7 (labelled 332) before the next dynamic slot (slot m+1) commences at matching minislot x+8 (labelled 333).

Despite the possible existence of two timing regimes operating within the nodes, namely one group operating according to the timeline 320 and another group operating according to the timeline 330, there are no collisions or arbitration problems, either intra-group or inter-group.

The two timing regimes 320 and 330 will be resolved across all nodes when the next frame is transmitted. If the node which sends the next frame is operating according to the timeline 320, then upon transmission, all nodes using the timeline 320 will recognise commencement of a frame in a matching slot, and will take no action. All nodes using the timeline 330 will notice commencement of a frame in a mismatching slot and will take the appropriate action detailed for fault a) above to rectify this problem, whereupon all nodes of the system will be resolved to the timeline 320.

In a similar way, if the node which sends the next frame is operating according to the timeline 330, then upon transmission, all nodes using the timeline 330 will take no action and all nodes using the timeline 320 will take the appropriate action detailed for fault a) above, whereupon all nodes of the system will be resolved to the timeline 330.

It will be understood by a person skilled in the art that alternative embodiments to those described above are possible. For example, the number of slots, minislots and macroticks associated with each segment may differ from those described above.

Furthermore the minislot action points described above need not occur at the boundary between the first and second macroticks of each minislot, but for example they may be arranged to occur between second and third macroticks in a minislot having at least three macroticks.

It will be understood that the method for collision free combined static and dynamic media arbitration based on a system wide synchronized time base described above provides the following advantages: —provides a closed concept for both static (pre-scheduled) and dynamic (run-time determined) media arbitration, —provides a periodically recurring communication pattern, —provides bounded and deterministic communication jitter, and—is capable of compensating large oscillator drifts.

Each node maintains a specific segment (dynamic segment) that is composed of a set of subsequent minislots. A minislot is a time window of a specific duration that is composed of multiple macroticks.

Each minislot contains a minislot action point that is offset by a specific number of macroticks from the start of each minislot. The offset of the action point is chosen such that under the assumption that the macroticks among all nodes are synchronized within a precision p the action points of all nodes occur within the same minislot in respect to one another.

At any given point throughout the dynamic segment a node either transmits a valid frame, or receives a communication element or receives nothing, when the network is idle. A communication element may be either a valid frame or an invalid frame. An invalid frame can be either a corrupted frame, i.e. a frame that was transmitted as a valid frame but got corrupted on the network, or noise, i.e. a waveform that does not relate to a valid frame and could, for example, have been induced in the network via electro-magnetic interference.

As illustrated in FIGS. 1-4, in order to schedule transmissions of frames in the dynamic segment each node maintains and uses a slot counter, such as minislot counter 912 of FIG. 9, to count dynamic slots. In addition one or more unique slot identifiers ranging from some starting value g (that is common to all nodes) to an end value h may be assigned to a node for the purpose of transmission. Assignment of a specific slot identifier is exclusive such that if a specific slot identifier has been assigned to one node the same slot identifier cannot be assigned to a different node.

At the start of the dynamic segment every node initializes the slot counter to the value g.

As illustrated in FIGS. 1 and 3, if the slot identifier g is assigned to a specific node then this node will perform the following procedure:

a) the node starts transmission at the action point of the minislot associated with dynamic slot g, and b) the node ends transmission at the action point of a subsequent minislot (depending on the duration of the frame to be transmitted), and c) after a further configuration dependent number of minislots the node increments the slot counter by 1 to g+1.

If the slot identifier g+1 is assigned to this node then the same procedure will repeat (albeit with the slot counter now having the value g+1).

As illustrated in FIGS. 2 and 4, if the slot identifier g is not assigned to a specific node then this node will perform different procedures depending on whether communication is received or not.

If no communication is received, i.e. the communication channel remains idle through the minislot, then the node increments the slot counter by 1 to g+1 at the end of the minislot.

If communication is received then a) at the beginning of the communication the node a. Initializes a bit counter to 0, and b. Initializes a shadow slot counter with the value of the slot counter;

b) throughout the communication the node a. increments the bit counter for every sampled bit, and b. increments the shadow slot counter at the end of every minislot;

c) at the end of the communication the node determines the minislot that ends the dynamic slot;

d) the node continues incrementing the shadow slot counter until the minislot that ends the dynamic slot is reached;

e) at the end of the minislot that ends the dynamic slot the node a. increments the slot counter by 1 if a valid frame is received or the value of the bit counter exceeds a predefined threshold value b. sets the value of the slot counter to the value of the shadow slot counter+1 and refrains from transmitting in the subsequent dynamic slot (if the slot identifier of that slot is assigned to the node) in all other cases.

In the foregoing specification, the invention has been described with reference to specific examples of embodiments of the invention. It will, however, be evident that various modifications and changes may be made therein without departing from the broader spirit and scope of the invention as set forth in the appended claims.

For example, the invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

All or some of the software described herein may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A communication network for providing media arbitration via a communications protocol using consecutive communication slots in the communication network, the communication network comprising:

a plurality of communication nodes, each node arranged for communicating frames of data with the other nodes during a dynamic segment, the dynamic segment includes dynamic communication slots with respective communication slot numbers, wherein each of the plurality of communication nodes includes:

a time base comprising consecutive timeslots, associated with the dynamic communication slots, each timeslot comprises a transmission action point, wherein transmission of each frame of data starts and ends at a transmission action point;

a communication slot number controller, for adjusting a communication slot number if no communication is ongoing at the end of a time slot and to suspend adjusting the communication slot number if communication is ongoing at the end of a time slot;

a minislot counter for counting minislots of the dynamic segment while the adjusting of the communication slot number counter is suspended; and the communication slot number controller to either continue the adjusting of the communication slot number if a determined duration of a reception of a frame is above a certain threshold or to continue adjusting of the communication slot number using a value obtained with the minislot counter if the determined duration of the reception of the frame is below a certain threshold, and wherein transmission is suppressed in dynamic slots that follow a dynamic slot in which the determined duration of the reception of the frame is below the certain threshold.

2. A communication node for a communication network, the communication network comprising:

a plurality of communication nodes, each node arranged for communicating frames of data with the other nodes during a dynamic segment, the dynamic segment includes dynamic communication slots with respective communication slot numbers, the communication node including:
- a time base comprising consecutive timeslots, associated with the dynamic communication slots, each timeslot comprises a transmission action point, wherein transmission of each frame of data starts and ends at a transmission action point;
- a communication slot number controller, for adjusting a communication slot number if no communication is ongoing at the end of a time slot and to suspend adjusting the communication slot number if communication is ongoing at the end of a time slot;
- a minislot counter for counting minislots of the dynamic segment while the adjusting of the communication slot number counter is suspended; and
- the communication slot number controller to either continue the adjusting of the communication slot number if a determined duration of a reception of a frame is above a certain threshold or to continue adjusting of the communication slot number using a value obtained with the minislot counter if the determined duration of the reception of the frame is below a certain threshold, and wherein
- transmission is suppressed in dynamic slots that follow a dynamic slot in which the determined duration of the reception of the frame is below the certain threshold.

3. A method for providing media arbitration in a communication network, the communication network comprising: a plurality of communication nodes, each node arranged for communicating frames of data with the other nodes during a dynamic segment comprising dynamic communication slots with respective communication slot numbers and having a time base comprising consecutive time slots, associated with the dynamic communication slots, each timeslot time slot comprises a transmission action point, wherein transmission of each frame of data starts and ends at a transmission action point, the method comprising:
- adjusting a communication slot number if no communication is ongoing at the end of a time slot; and
- if communication is ongoing at the end of a time slot:
  - suspending the adjusting the communication slot number;
  - counting minislots of the dynamic segment while the adjusting of the communication slot number is suspended;
  - determining a duration of a reception of a frame;
  - continue adjusting the communication slot number if the determined duration of the reception is above a certain threshold; or
  - continue adjusting the communication slot number using a value obtained within a minislot counter if the determined duration of the reception is below the certain threshold; and
- suppressing transmission in dynamic slots that follow a dynamic slot in which the determined duration of the reception of the frame is below the certain threshold.

4. A communication controller for a network node as claimed in claim 2, comprising:
- a memory for storing a time base comprising consecutive timeslots, associated with the dynamic communication slots, each timeslot comprises a transmission action point, wherein transmission of each frame of data starts and ends at a transmission action point.

5. A communication controller for a network node as claimed in claim 4, further comprising:
- a communication slot number controller, for adjusting a communication slot number if no communication is ongoing at the end of a time slot and to suspend adjusting the communication slot number if communication is ongoing at the end of a time slot.

6. A communication controller for a network node as claimed in claim 5, further comprising:
- a minislot counter for counting minislots of the dynamic segment while the adjusting of the communication slot number is suspended.

7. A communication controller for a network node as claimed in claim 6,
- wherein a duration of a reception of a frame is determined.

8. A communication controller for a network node as claimed in claim 7, further comprising:
- the communication slot number controller to either continue adjusting of the communication slot number if a determined duration of a reception of a frame is above a certain threshold or to continue adjusting of the communication slot number using the value obtained with the minislot counter if the determined duration of the reception of the frame is below the certain threshold.

9. A communication controller for a network node as claimed in claim 8,
- wherein transmission is suppressed in dynamic slots that follow a dynamic slot in which the determined duration of the reception of the frame is below the certain threshold.

10. The method as claimed in claim 3, further comprising:
- adjusting at a communication controller of a network node, a communication slot number if no communication is ongoing at the end of a time slot and to suspend adjusting the communication slot number if communication is ongoing at the end of a time slot.

11. The method as claimed in claim 10, further comprising:
- counting, at the communication controller of the network node, minislots of the dynamic segment while the adjusting of the communication slot number is suspended.

12. The method as claimed in claim 11, further comprising:
- determining, at the communication controller of the network node, a duration of a reception of a frame.

13. The method as claimed in claim 12, further comprising:
- controlling, at the communication controller of the network, the communication slot number controller to either continue adjusting of the slot number if the determined duration of the reception of the frame is above a certain threshold or to continue adjusting of the slot number using the value obtained with the minislot counter if the determined duration of the reception of the frame is below a certain threshold.

14. The method as claimed in claim 13, further comprising:
- suppressing, at the communication controller of the network node, transmission in dynamic slots that follow a dynamic slot in which the determined duration of the reception of the frame is below a certain threshold.

15. A communication controller for a network node as claimed in claim 2, further comprising:
- a communication slot number controller, for adjusting a communication slot number if no communication is ongoing at the end of a time slot and to suspend adjusting the communication slot number if communication is ongoing at the end of a time slot.

16. A communication controller for a network node as claimed in claim 15, further comprising:

a minislot counter for counting minislots of the dynamic segment while the adjusting of the communication slot number is suspended.

17. A communication controller for a network node as claimed in claim 16, further comprising:
the communication slot number controller to either continue adjusting of the communication slot number if a determined duration of a reception of a frame is above a certain threshold or to continue adjusting of the communication slot number using a value obtained with the minislot counter if the determined duration of the reception of the frame is below the certain threshold.

18. A communication controller for a network node as claimed in claim 17,
wherein transmission is suppressed in dynamic slots that follow a dynamic slot in which the determined duration of the reception of the frame is below the certain threshold.

19. The method of claim 3, further comprising:
storing, at a memory, a time base comprising consecutive timeslots, associated with the dynamic communication slots, each timeslot comprises a transmission action point, wherein transmission of each frame of data starts and ends at a transmission action point.

20. The method of claim 3, wherein a first minislot of the dynamic segment is a matching minislot and a second minislot of the dynamic segment is a mismatching minislot.

* * * * *